(12) United States Patent
Alfaro et al.

(10) Patent No.: US 7,155,846 B2
(45) Date of Patent: Jan. 2, 2007

(54) ARTICLE OF FOOTWEAR WITH EXTERIOR RIBS

(75) Inventors: Charlie N. Alfaro, Tigard, OR (US); Bryant T. Bainbridge, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 10/860,801

(22) Filed: Jun. 3, 2004

(65) Prior Publication Data

US 2005/0268497 A1 Dec. 8, 2005

(51) Int. Cl.
A43B 23/00 (2006.01)

(52) U.S. Cl. .......................... 36/136; 36/45

(58) Field of Classification Search .................. 36/112, 36/136, 137, 45, 59 R; 40/636, 453; D2/972
See application file for complete search history.

(56) References Cited

U.S. PATENT DOCUMENTS

| 1,617,430 A | | 2/1927 | Wolfelt | |
| 1,974,543 A | | 9/1934 | Reymond | |
| 4,045,888 A | * | 9/1977 | Oxenberg | 36/114 |
| 4,233,767 A | * | 11/1980 | Hryhorczuk | 40/453 |
| 4,255,380 A | * | 3/1981 | Bjorkland | 264/505 |
| 4,697,362 A | * | 10/1987 | Wasserman | 36/136 |
| 4,712,314 A | * | 12/1987 | Sigoloff | 36/112 |
| 4,712,319 A | * | 12/1987 | Goria | 36/137 |
| 4,852,276 A | * | 8/1989 | Savoca et al. | 36/136 |
| D305,077 S | | 12/1989 | McKinstry | D2/314 |
| D307,974 S | | 5/1990 | McKinstry | D2/314 |
| D311,091 S | | 10/1990 | McKinstry | D2/314 |
| D311,809 S | | 11/1990 | Jimenez | D2/314 |
| D311,987 S | | 11/1990 | McKinstry | D2/314 |
| D315,389 S | | 3/1991 | Spence | D2/314 |
| D316,475 S | | 4/1991 | McKinstry | D2/314 |
| D320,688 S | | 10/1991 | McKinstry | D2/314 |
| D325,117 S | | 4/1992 | Magdaleno | D2/314 |
| D330,450 S | | 10/1992 | Ruokis | D2/314 |
| D332,691 S | | 1/1993 | Shin | D2/326 |
| D332,693 S | | 1/1993 | Chen | D2/326 |
| 5,367,795 A | * | 11/1994 | Iverson et al. | 36/136 |
| 5,896,683 A | * | 4/1999 | Foxen et al. | 36/89 |
| 6,001,456 A | * | 12/1999 | Newland | 40/453 |
| 6,745,395 B1 | * | 6/2004 | Noble | 2/12 |
| 2004/0055183 A1 | * | 3/2004 | Lee et al. | 36/128 |
| 2004/0088888 A1 | * | 5/2004 | Johnston | 36/133 |
| 2006/0117604 A1 | * | 6/2006 | Fusco | 36/25 R |

FOREIGN PATENT DOCUMENTS

| DE | 8005936 | 5/1980 |
| FR | 621 060 | 5/1927 |
| GB | 860 265 A | 2/1961 |
| WO | WO 2004/089609 | 10/2004 |
| WO | WO 2004/093588 | 11/2004 |

OTHER PUBLICATIONS

International Search Report for PCT/US2005/019539.
L.A. Gear Shoe, L. A. Gear Air System Show and L.A. Gear Hightop Shoe. Date unknown, but believed to be earlier than 1 year prior to Jun. 3, 2004.

* cited by examiner

Primary Examiner—Ted Kavanaugh
(74) Attorney, Agent, or Firm—Banner & Witcoff, Ltd.

(57) ABSTRACT

An article of footwear includes a sole assembly and an upper secured to the sole assembly. A plurality of ribs is positioned on an exterior surface of at least one of the upper and the sole assembly, with each rib including a plurality of faces and each face having an image thereon.

27 Claims, 3 Drawing Sheets

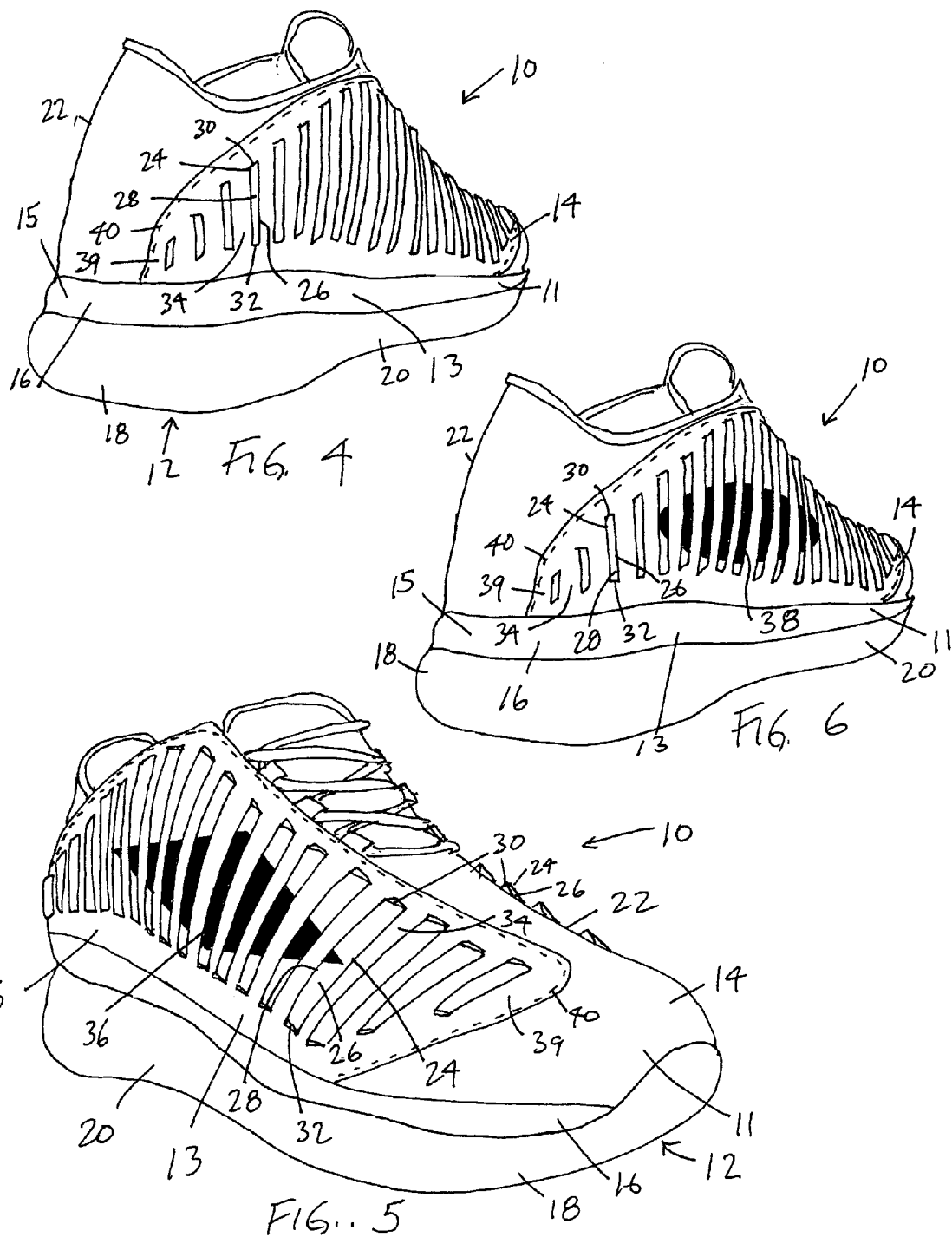

ARTICLE OF FOOTWEAR WITH EXTERIOR RIBS

FIELD OF THE INVENTION

This invention relates generally to an article of footwear, and, in particular, to an article of footwear with ribs on an exterior surface thereof.

BACKGROUND OF THE INVENTION

Conventional articles of athletic footwear include two primary elements, an upper and a sole assembly. The upper is often formed of leather, synthetic materials, or a combination thereof and comfortably secures the footwear to the foot, while providing ventilation and protection from the elements. The upper may also provide aesthetic benefits through the use of various designs and styling configurations. In addition, the upper may incorporate safety features, such as reflective portions, enhancing visibility of the user. The sole assembly generally incorporates multiple layers that are conventionally referred to as an insole, a midsole, and an outsole. The insole is a thin cushioning member located within the upper and adjacent the sole of the foot to enhance footwear comfort. The midsole, which is traditionally attached to the upper along the entire length of the upper, forms the middle layer of the sole assembly and serves a variety of purposes that include controlling potentially harmful foot motions, attenuating ground reaction forces, and absorbing energy. The outsole forms the ground-contacting element of footwear and is usually fashioned from a durable, wear resistant material that includes texturing to improve traction.

It is an object of the present invention to provide an article of footwear with ribs on an exterior surface thereof that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide an article of footwear with ribs on an exterior surface thereof.

In accordance with a first preferred embodiment, an article of footwear includes a sole assembly and an upper secured to the sole assembly. A plurality of ribs is positioned on an exterior surface of at least one of the upper and the sole assembly, with each rib including a plurality of faces and each face having an image thereon.

In accordance with another preferred embodiment, an article of footwear includes a sole assembly and an upper secured to the sole assembly. A plurality of substantially vertical ribs is positioned on at least one of the medial and lateral sides, each rib including a front face and a rear face.

In accordance with yet another preferred embodiment, an article of footwear includes a sole assembly and an upper secured to the sole assembly. A plurality of substantially vertical ribs are found on at least one of medial and lateral sides of an exterior surface of the upper. Each rib includes a front face and a rear face, with the front faces having a first color and being angled outwardly and rearwardly from the exterior surface at an obtuse angle, and the rear faces having a second color that is different than the first color and each rear face extending substantially perpendicular to the exterior surface.

In accordance with a further preferred embodiment, a method of manufacturing an article of footwear includes the steps of providing a sole assembly; forming an upper having a plurality of ribs on an exterior surface thereof, each rib including a plurality of faces and each face having an image thereon, the upper formed by insert molding a first material having a first color and a second material having a second color together; and securing the upper to the sole assembly.

In accordance with a still further preferred embodiment, a method of manufacturing an article of footwear includes the steps of providing a sole assembly; forming an upper having a plurality of ribs on an exterior surface thereof, each rib including a plurality of faces and each face having an image thereon, with the upper being formed by the steps of molding a first layer of knit material such that it has a desired ribbed shape; securing a second layer of a resin-impregnated non-woven material to the first layer; molding the first and second layers such that they have the desired ribbed shape; positioning a third layer of non-stretchable material adjacent the second layer; and positioning a fourth layer of a knit material adjacent the third layer; and securing the upper to the sole assembly.

In accordance with yet a further preferred embodiment, a method of manufacturing an article of footwear includes the steps of providing a sole assembly; forming an upper having a plurality of ribs on an exterior surface thereof, each rib including a plurality of faces and each face having an image thereon, with the upper formed by the steps of molding a first layer of synthetic leather such that it has a desired ribbed shape; positioning a second layer of a foam material adjacent an interior surface of the first layer; positioning a third layer of non-stretchable material adjacent the second layer; and positioning a fourth layer of a knit material adjacent the third layer; and securing the upper to the sole assembly.

Substantial advantage is achieved by providing an article of footwear with exterior ribs. In particular, certain preferred embodiments of the present invention provide aesthetic appeal and a different appearance from different viewing angles. Additionally, certain preferred embodiments provide enhanced visibility and safety for the user.

These and additional features and advantages of the invention disclosed here will be further understood from the following detailed disclosure of certain preferred embodiments.

BRIEF DESCRIPTION OF THE DRAWINGS

FIG. 4 is a rear perspective view of the article of footwear of FIG. 1.

FIG. 5 is a front perspective view of another preferred embodiment of an article of footwear of the present invention.

FIG. 6 is a rear perspective view of the article of footwear of FIG. 5.

Figure 1:
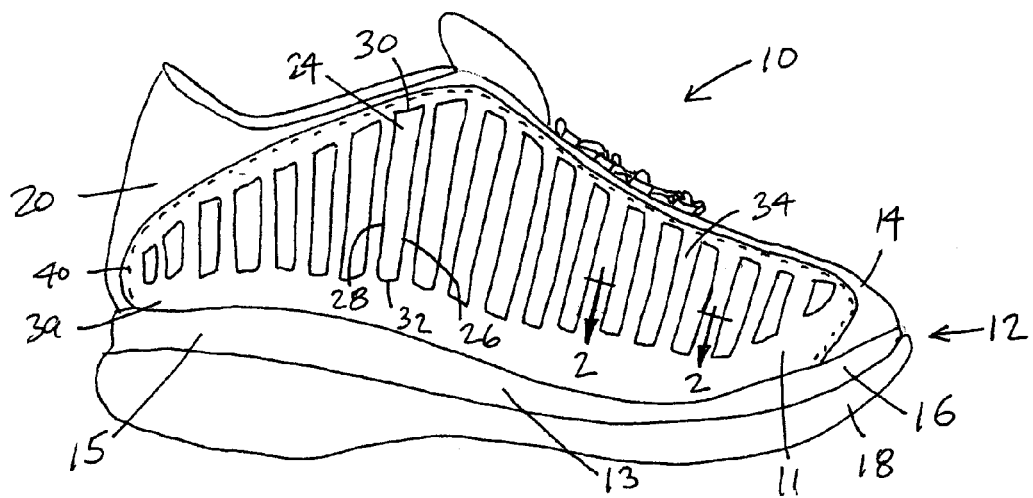
FIG. 1 is a side elevation view of an article of footwear in accordance with a preferred embodiment of the present invention.

The figures referred to above are not drawn necessarily to scale and should be understood to provide a representation of the invention, illustrative of the principles involved. Some features of the article of footwear depicted in the drawings have been enlarged or distorted relative to others to facilitate explanation and understanding. The same reference numbers are used in the drawings for similar or identical components and features shown in various alternative embodiments. Articles of footwear as disclosed herein would have configurations and components determined, in part, by the intended application and environment in which they are used.

DETAILED DESCRIPTION OF CERTAIN PREFERRED EMBODIMENTS

The present invention may be embodied in various forms. The following discussion and accompanying figures disclose an article of footwear 10 in accordance with the present invention. Footwear 10 may be any style of footwear including, for example, athletic footwear. Although the embodiments illustrated herein depict athletic footwear, the present invention is not to be restricted to athletic footwear, and could in fact be incorporated in any style of footwear.

A preferred embodiment of an article of footwear 10 is shown in FIG. 1. Footwear 10 includes a sole assembly 12 and an upper 14 secured to sole assembly 12. Upper 14 may be secured to sole assembly 12 by any suitable means including, for example, stitching or an adhesive. Upper 14 forms an interior void that comfortably receives a foot and secures the position of the user's foot relative to sole assembly 12. As noted above, the configuration of upper 14 depicted here is suitable for use during athletic activities. Accordingly, upper 14 may have a lightweight, breathable construction that includes multiple layers of leather, textile, polymer, and foam elements adhesively bonded and stitched together. For example, upper 14 may have an exterior that includes leather elements and textile elements for resisting abrasion and providing breathability, respectively. The interior of upper 14 may have foam elements for enhancing the comfort of footwear 10, and the interior surface may include a moisture-wicking textile for removing excess moisture from the area immediately surrounding the foot.

For purposes of general reference, footwear 10 may be divided into three general portions: a forefoot portion 11, a midfoot portion 13, and a heel portion 15. Portions 11, 13, and 15 are not intended to demarcate precise areas of footwear 10. Rather, portions 11, 13, and 15 are intended to represent general areas of footwear 10 that provide a frame of reference during the following discussion.

Sole assembly 12 includes a midsole 16 to which upper 14 is secured, and an outsole 18, which may include a tread pattern (not shown) for added traction. An insole (not shown) may be positioned within upper 14 above midsole 16. Footwear 10 has a medial, or inner, side 20 and a lateral, or outer, side 22. Although sides 20, 22 apply generally to footwear 10, references to sides 20, 22 may also apply specifically to upper 14, sole assembly 12, or any other individual component of footwear 10.

Unless otherwise stated, or otherwise clear from the context below, directional terms used herein, such as rear, rearwardly, front, forwardly, inwardly, outwardly, lower, downwardly, upper, upwardly, etc., refer to directions relative to footwear 10 itself. Footwear 10 is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 15, that is, to the left as seen in FIG. 1. Naturally, forwardly is toward forefoot portion 11, that is, to the right as seen in FIG. 1, downwardly and lower are toward the bottom of the page as seen in FIG. 1, and upwardly is toward the top of the page as seen in FIG. 1. Inwardly is toward the center of footwear 10, and outwardly is toward the outer periphery of footwear 10.

Figure 3:
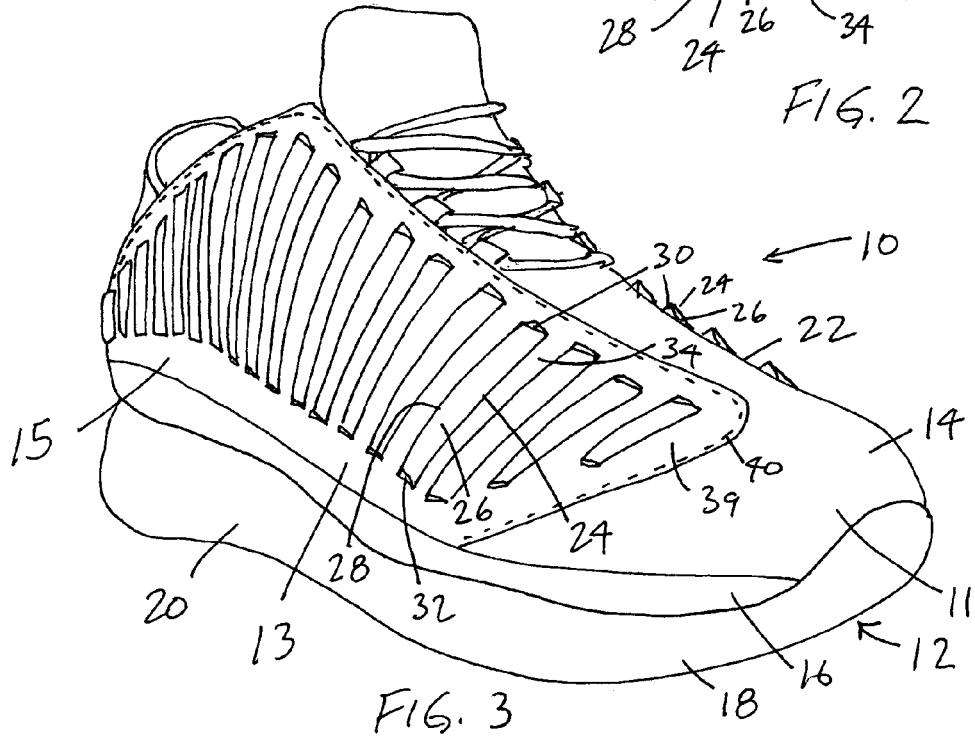
FIG. 3 is a front perspective view of the article of footwear of FIG. 1.

Footwear 10 includes a plurality of ribs 24. In the illustrated embodiment, ribs 24 are disposed on medial side 20 and lateral side 22 of upper 14. It is to be appreciated that in certain preferred embodiments, ribs 24 may be on only one of medial side 20 and lateral side 22. In other embodiments, ribs 24 may be disposed on other portions of footwear 10 including, for example, outsole 18, midsole 16, and other portions of upper 14 such as the rear of heel portion 15, the tongue, and toe portion 11. In the embodiments illustrated herein, for the most part only the ribs 24 on medial side 20 are visible. It is to be appreciated that the ribs 24 on lateral side 22, portions of which are visible in FIG. 3, are similar to those illustrated on medial side 20. In the illustrated embodiment, ribs 24 preferably extend substantially vertically along upper 14. It is to be appreciated that other orientations of ribs 24, for example, horizontal and at any desired angle, are considered to be within the scope of the present invention.

Ribs 24 include a plurality of faces. As illustrated here, ribs 24 include a front face 26, a rear face 28, a top face 30, and a bottom face 32. Ribs 24 may include any number of faces, and other combinations of faces for ribs 24 are considered to be within the scope of the present invention.

Figure 2:
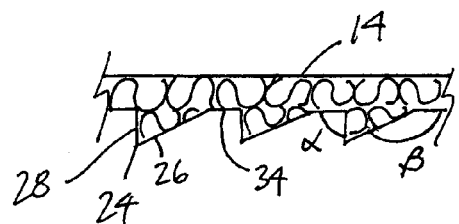
FIG. 2 is a section view of the upper of the article of footwear of FIG. 1, taken along line 2—2 of FIG. 1, showing ribs projecting outwardly from the upper.

As seen in FIG. 2, front face 26 is disposed at an angle $\beta$ with respect to an exterior surface 34 of upper 14. Rear face 28 is disposed at an angle $\alpha$ with respect to exterior surface 34. In a preferred embodiment, angle $\beta$ is obtuse, or greater than 90°, and angle $\alpha$ is approximately 90°. In such an embodiment, when viewed from the side, as seen in FIG. 1, or from the front, as seen in FIG. 3, a user only sees front faces 26 of ribs 24; rear faces 28 are not visible to the user. Conversely, when viewed from the rear, as seen in FIG. 4, the user sees only rear faces 28 of ribs 24; front faces 26 are not visible to the user.

In certain preferred embodiments, some faces have images formed thereon that are different than images formed on other faces. In certain preferred embodiments, one subset of the plurality of faces has a first image thereon while another subset of the plurality of faces has a second image thereon. In the embodiment illustrated here, front faces 26 have a different image than rear faces 28. For example, front faces 26 may have a first color while rear faces 28 have a second, different color. Thus, when the user views footwear 10 from the front, as seen in FIG. 3, they see only front faces 26 and the first color. However, when they view footwear 10 from the rear, as seen in FIG. 4, the see only rear faces 28 and the second color.

Such a construction of footwear 10 provides an interesting an appealing aesthetic appearance by providing a different look for footwear 10 depending on the angle from which footwear 10 is viewed by the user. While the description here is directed primarily to different images found on front and rear faces 26, 28 of ribs 24, it is to be appreciated that different images can be provided on any of the faces of ribs 24, thereby providing different appearances for footwear 10 from any desired angle.

Other aesthetic variations can be provided as images on ribs 24, providing a different look from the front and back of footwear 10, or from other viewing angles. For example, front faces 26 and rear faces 28 may have different finishes, or they may be formed of different materials. In certain embodiments, the surfaces of front faces 26 and/or rear faces 28 may be reflective, enhancing the safety of the user.

In another preferred embodiment, as seen in FIG. 5, a first image 36, illustrated here as a symbol or logo, can be provided on front faces 26 of ribs 24. A portion of image 36 is placed on one or more of front faces 26. It is to be appreciated that any number of front faces 26 may be used to display image 36. Image 36 may, as illustrated here, be broken down into segments that are displayed on a plurality of front faces 26. In other embodiments, image 36 could comprise a plurality of individual designs placed on different front faces 26. When viewed from the front, image 36 appears to the user.

A second image 38 can be provided on rear faces 28, as seen in FIG. 6 where image 38 is a football. Like image 36 described above, any number of rear faces 28 may be used to display image 38. Image 38 may, as illustrated here, be broken down into segments that are displayed on a plurality of rear faces 28. In other embodiments, image 38 could comprise a plurality of individual designs placed on different rear faces 28. When viewed from the rear, image 38 appears to the user.

First and second images 36, 38 may take any configuration. For example, images 36, 38 could be alphanumeric characters, allowing an individual to have a name or number displayed on footwear 10. As illustrated here, images 36, 38 are segmented, with the individual segments placed on different faces of ribs 24. It is to be appreciated that individual, complete and distinct images, such as an individual letter or number, could be placed on one or more faces of ribs 24.

As illustrated in FIGS. 1, 3–6, ribs 24 may be contained within a panel 39 that is secured to upper 14, such as by stitching 40. In other embodiments, ribs 24 may be contained within upper 14 itself without a separate panel being secured to upper 14.

Figure 7:
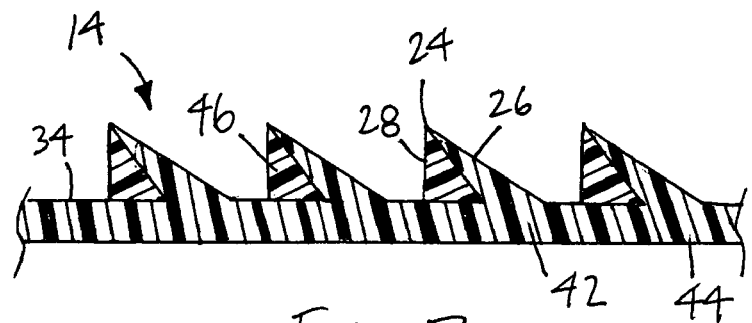
FIG. 7 is a section view of a preferred embodiment of an upper of an article of footwear in accordance with the present invention.

Ribs 24 can be constructed in many different ways. One preferred construction of ribs 24 is illustrated in FIG. 7, in which ribs 24 are formed by injection molding two different plastic materials to form panel 39 of upper 14. Such an embodiment may be formed by way of insert molding, which uses a double injection to get two different colors of the same resin or two different but compatible materials to mold together. As illustrated here, a first material 42 forms a base portion 44 of panel 39 and front faces 26, while a second material 46 forms rear faces 28. First and second materials may have different colors, different finishes, be different materials, or contain any desired pattern or image thereon as described above. It is to be appreciated that base portion 44 may be the same material as rear faces 28 with front faces 26 formed of a different material. Suitable materials for injection molding ribs 24 will become readily apparent to those skilled in the art, given the benefit of this disclosure.

Figure 8:
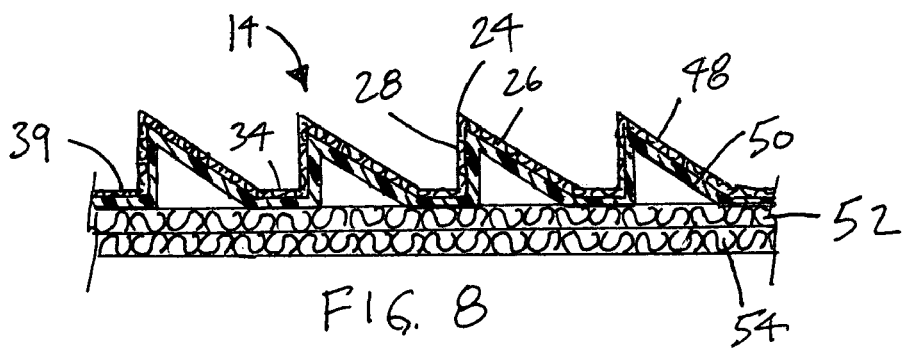
FIG. 8 is a section view of another preferred embodiment of an upper of an article of footwear in accordance with the present invention.

Another preferred embodiment of panel 39 including ribs 24 is shown in FIG. 8. In this embodiment, panel 39 includes a first outer layer 48 formed of knit material and a second layer 50 formed of a resin-impregnated non-woven material, which is positioned inwardly of and adjacent first layer 48. First and second layers 48, 50 form ribs 24. The resin-impregnated non-woven material layer 50 helps knit outer layer 48 maintain its ribbed shape.

Since layers 48, 50 are formed of a knit material and a non-woven material, respectively, they can be molded under heat and pressure or otherwise formed to produce the shape required for ribs 24. In a preferred embodiment, first layer 48 is placed in a mold and molded to the desired ribbed shape, and then second layer 50 is placed in a mold with first layer 48 and the combined layers are molded to the desired shape. It is to be appreciated that first and second layers 48, 50 may alternatively be molded together in a single step. Other methods of molding first and second layers 48, 50 will become readily apparent to those skilled in the art, given the benefit of this disclosure.

A third layer 52 formed of a non-stretchable knit material is positioned inwardly of second layer 50. Third layer 52 is formed of a non-stretchable material so that when panel 39 and upper 14 are stretched about a last to form footwear 10, ribs 24 are not themselves stretched and deformed. A fourth layer 54 may be provided inwardly of third layer 52, and acts as a soft liner that comes in contact with the user's foot. Fourth layer 54 may be formed of any suitable soft material, such as a knit material.

Figure 9:
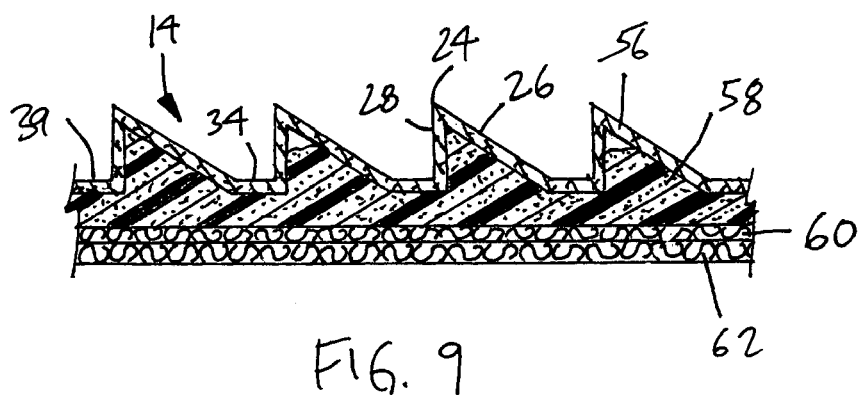
FIG. 9 is a section view of a further preferred embodiment of an upper of an article of footwear in accordance with the present invention.

Another preferred embodiment of ribs 24 is shown in FIG. 9. In this embodiment, panel 39 includes a first outer layer 56 formed of synthetic leather. The synthetic leather of first layer 56 may be a non-woven material with a polyurethane coating, having a smooth or brushed finish. A second layer 58 formed of foam material is positioned inwardly and adjacent first layer 56. The synthetic leather of first layer 56 may be formed using a heated compression mold. The foam second layer 58 may then be molded to mate with the voids that are formed in first layer 56 when it is molded. It is to be appreciated that the foam material of second layer 58 may or may not reach upwardly into the peaks of ribs 24.

A third layer 60 formed of a non-stretchable knit material is positioned inwardly of second layer 58. Third layer 60 is formed of a non-stretchable material so that when panel 39 and upper 14 are stretched about a last to form footwear 10, ribs 24 are not themselves stretched and deformed. A fourth layer 62 may be provided inwardly of third layer 60, and acts as a soft liner that comes in contact with the user's foot. Fourth layer 62 may be formed of any suitable soft material, such as a knit material.

Figure 10:
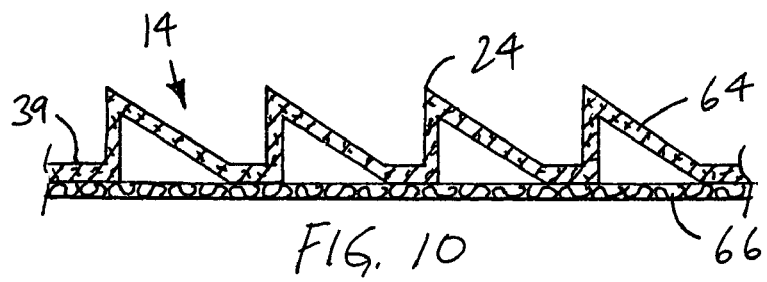
FIG. 10 is a section view of yet another preferred embodiment of an upper of an article of footwear in accordance with the present invention.

In another preferred embodiment, as seen in FIG. 10, ribs 24 may be formed of an outer layer 64 of synthetic leather that is formed to the desired rib shape and an inner layer 66 that acts as a soft liner that comes in contact with the user's foot. Inner layer 66 may be formed of any suitable soft material such as a knit material. Outer layer 64 is preferably molded to form ribs 24 in a heated compression mold. It is to be appreciated that other materials may be used for outer layer 64, and other suitable materials will become readily apparent to those skilled in the art.

In the embodiments described with respect to FIGS. 8–10, color can be applied to the faces in a variety of ways. For example, different colors can be sprayed or otherwise painted onto front faces 26 and rear faces 28 of first layers 48, 56, 64 either before or after the layers are molded to their desired form. The colors can also be applied by dying the material that forms first layers 48, 56, 64. In other embodiments, a strip of colored material may be secured to the desired face by adhesive, ultrasonic welding or any other suitable manner.

It is to be appreciated that there are many ways of constructing ribs 24. For example, panel 39 could include two colored layers; with a portion of the outer layer being cut away to expose front face 26 or rear face 28. Other suitable constructions of ribs 24 will become readily apparent to those skilled in the art, given the benefit of this disclosure.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. An article of footwear comprising, in combination:
a sole assembly;
an upper secured to the sole assembly; and
a plurality of ribs on an exterior surface of at least one of the upper and the sole assembly, each rib including a plurality of faces and each face having an image thereon, the image on at least one face being different than the image on at least one other face.

2. The article of footwear of claim 1, wherein each image comprises a color.

3. The article of footwear of claim 2, wherein the color of a first subset of the faces is different than the color of at least one other subset of the faces.

4. The article of footwear of claim 1, wherein a portion of a first symbol is formed on each of a first subset of the faces.

5. The article of footwear of claim 4, wherein a portion of a second symbol is formed on each of a second subset of the faces.

6. The article of footwear of claim 5, wherein each rib includes a front face and rear face, the first symbol being formed on a plurality of the front faces and the second symbol being formed on a plurality of the rear faces.

7. The article of footwear of claim 1, wherein each rib includes a front face and rear face, each front face being angled outwardly and rearwardly from the exterior surface at an obtuse angle.

8. The article of footwear of claim 7, wherein each rear face is substantially perpendicular to the exterior surface.

9. The article of footwear of claim 1, wherein at least one face is formed of a reflective material.

10. The article of footwear of claim 1, wherein a portion of the upper including the ribs includes a layer of knit material, a layer of a resin-impregnated non-woven material adjacent the knit material, and a layer of non-stretchable material adjacent the non-woven material.

11. The article of footwear of claim 10, further comprising a layer of knit material adjacent the layer of non-stretchable material.

12. The article of footwear of claim 1, wherein the ribs are formed of a layer of knit material and a layer of resin-impregnated non-woven material.

13. The article of footwear of claim 1, wherein a portion of the upper including the ribs includes a layer of synthetic leather, a layer of foam material adjacent the synthetic leather, and a layer of non-stretchable material adjacent the foam material.

14. The article of footwear of claim 13, further comprising a layer of knit material adjacent the layer of non-stretchable material.

15. The article of footwear of claim 1, wherein the ribs are formed of synthetic leather.

16. The article of footwear of claim 1, wherein a portion of the upper including the ribs is injected molded plastic.

17. The article of footwear of claim 16, wherein a first subset of the faces is formed of a first plastic material and a second subset of the faces is formed of a second plastic material.

18. The article of footwear of claim 1, wherein the ribs are positioned on at least one of medial and lateral sides of the upper.

19. The article of footwear of claim 1, wherein the ribs extend substantially vertically on at least one of medial and lateral sides of the upper.

20. An article of footwear comprising, in combination:
a sole assembly; and
an upper secured to the sole assembly; and
a plurality of substantially vertical ribs on at least one of medial and lateral sides of the upper, each rib including a front face and a rear face and each face having an image thereon, the image on at least one face being different than the image on at least one other face.

21. The article of footwear of claim 20, the front faces having a first color and the second faces having a second color that is different than the first color.

22. The article of footwear of claim 20, wherein a portion of a first symbol is formed on each of a plurality of the front faces.

23. The article of footwear of claim 20, wherein a portion of a second symbol is formed on each of a plurality of the rear faces.

24. The article of footwear of claim 20, wherein each front face is angled outwardly and rearwardly from an exterior surface of the upper at an obtuse angle and each rear face is substantially perpendicular to the exterior surface of the upper.

25. The article of footwear of claim 20, wherein a portion of the upper including the ribs includes an outer layer of knit material, a layer of a resin-impregnated non-woven material adjacent the knit material, a layer of non-stretchable material adjacent the non-woven material, and a layer of knit material adjacent the layer of non-stretchable material.

26. The article of footwear of claim 20, wherein a portion of the upper including the ribs includes an outer layer of synthetic leather, a layer of foam material adjacent the synthetic leather, a layer of non-stretchable material adjacent the foam material, and a layer of knit material adjacent the layer of non-stretchable material.

27. An article of footwear comprising, in combination:
a sole assembly;
an upper secured to the sole assembly; and
a plurality of substantially vertical ribs on at least one of its medial and lateral sides of an exterior surface of the upper, each rib including a front face and a rear face, the front faces having a first color and being angled outwardly and rearwardly from the exterior surface at an obtuse angle, the rear faces having a second color that is different than the first color and each rear face extending substantially perpendicular to the exterior surface.

* * * * *